United States Patent
Shastry et al.

(10) Patent No.: US 8,078,421 B1
(45) Date of Patent: Dec. 13, 2011

(54) MULTI-CELL DISK DRIVE TEST SYSTEM PROVIDING A POWER RECOVERY MODE

(75) Inventors: Amarnath Shastry, Thunyaburi (TH); Clinton A. Bell, Thunyaburi (TH)

(73) Assignee: Western Digital Technologies, Inc., Irvine, CA (US)

( * ) Notice: Subject to any disclaimer, the term of this patent is extended or adjusted under 35 U.S.C. 154(b) by 1013 days.

(21) Appl. No.: 11/960,658

(22) Filed: Dec. 19, 2007

(51) Int. Cl.
- G06F 19/00 (2011.01)
- G06F 13/00 (2006.01)
- G06F 11/00 (2006.01)
- G11B 19/00 (2006.01)

(52) U.S. Cl. ......... 702/115; 714/15; 711/158; 369/53.1; 360/31

(58) Field of Classification Search .................. 702/115; 369/47.5, 53.1; 711/158; 714/15; 360/31
See application file for complete search history.

(56) References Cited

U.S. PATENT DOCUMENTS

| | | | |
|---|---|---|---|
| 6,044,475 A | 3/2000 | Chung et al. | |
| 6,052,793 A | 4/2000 | Mermelstein | |
| 6,330,689 B1 | 12/2001 | Jin et al. | |
| 6,401,216 B1 | 6/2002 | Meth et al. | |
| 6,594,779 B1 | 7/2003 | Chandra et al. | |
| 7,062,398 B1 | 6/2006 | Rothberg | |
| 7,076,692 B2 | 7/2006 | Grey | |
| 7,079,339 B1 * | 7/2006 | Semba et al. | 360/31 |
| 2006/0047925 A1 | 3/2006 | Perry | |
| 2006/0242459 A1 * | 10/2006 | Hyde et al. | 714/15 |

OTHER PUBLICATIONS

"Automated Production Test Solutions" brochure, Xyratex Corporation, 6 pages.

* cited by examiner

*Primary Examiner* — Bryan Bui

(57) ABSTRACT

A multi-cell disk drive test system that provides a power recovery mode is disclosed. The multi-cell disk drive test system includes a test platform having a plurality of cells configured to receive and to provide communication with disk drives loaded therein, respectively, and test logic. The test logic is coupled to a cell and is configured to operate a test application to: execute a series of test modules to test a disk drive loaded in the cell; switch from a normal mode to a power recovery mode responsive to a power recovery flag relating to a power failure; and in the power recovery mode, read a test sequence index identifying a last completed test module before the power failure and execute a subsequent series of test modules following the last completed test module for the disk drive.

24 Claims, 7 Drawing Sheets

MULTI-CELL DISK DRIVE TEST SYSTEM PROVIDING A POWER RECOVERY MODE

BACKGROUND

1. Field of the Invention

The present invention relates to methods and systems for testing disk drives, and more particularly, to a multi-cell disk drive test system used to test disk drives and that provides a power recovery mode.

2. Description of the Related Art

A huge market exists for disk drives for mass-market computing devices such as desktop computers and laptop computers, as well as small form factor (SFF) disk drives for use in mobile computing devices (e.g. personal digital assistants (PDAs), cell-phones, digital cameras, etc.). To be competitive, a disk drive should be relatively inexpensive and provide substantial capacity, rapid access to data, and reliable performance.

Disk drives typically employ a moveable head actuator to frequently access large amounts of data stored on a disk. One example of a disk drive is a hard disk drive. A conventional hard disk drive typically includes a head disk assembly (HDA) including at least one magnetic disk (disk), a spindle motor for rapidly rotating the disk, and a head stack assembly (HSA) that includes a head gimbal assembly (HGA) with a moveable transducer head for reading and writing data. The HSA forms part of a servo control system that positions the moveable transducer head over a particular track on the disk to read or write information from and to that track, respectively. Further, a conventional hard disk drive generally includes a printed circuit board assembly (PCBA) for the electronics of the disk drive.

Typically, a conventional hard disk drive includes one or more disks in which each disk has a plurality of concentric tracks. Each surface of each disk conventionally contains a plurality of concentric data tracks angularly divided into a plurality of data sectors. In addition, special servo information may be provided on each disk to determine the position of the moveable transducer head. The most popular form of servo is called "embedded servo" wherein the servo information is written in a plurality of servo sectors that are angularly spaced from one another and are interspersed between the data sectors around each track of each disk. Each servo sector typically includes a preamble generally having at least a track identification (TKID) field and a sector ID field and a group of servo bursts (e.g. an alternating pattern of magnetic transitions) which the servo control system of the disk drive samples to align the moveable transducer head with or relative to a particular track for the reading and writing of data.

During disk drive manufacturing, the disk drive typically undergoes a variety of tests and procedures to configure and validate the proper operation of the disk drive. Such testing is conventionally carried out in a multi-cell disk drive test platform that includes a bank of cells into which the disk drives are loaded and unloaded such that a sequential series of tests and procedures can be administered to the loaded disk drives. Some of the tests and procedures are subject to strict environmental control requirements. A wide variety of procedures, such as loading software and firmware, and tests, such as testing the servo control system, may be performed.

Because disk drive testers and disk drive testing represent such large expenditures for disk drive manufacturers, more efficient testers and testing procedures are continuously sought after in order to reduce inefficiencies and costs and to increase disk drive throughput.

One particular source of inefficiency associated with conventional multi-cell disk drive test systems is that, during a power failure, the entire multi-cell disk test system re-sets and each test process being performed at each cell is re-started again from beginning of the test process. This results in a great deal of wasted time and therefore additional costs are added to the disk drive manufacturing process. Accordingly, it is desirable to more efficiently deal with the occurrences of power failures during disk drive testing.

DETAILED DESCRIPTION

In the following description, numerous specific details are set forth. However, it is understood that embodiments of the invention may be practiced without these specific details. In other instances, well-known circuits, structures, and techniques have not been shown in order not to obscure the understanding of this description.

Figure 1:
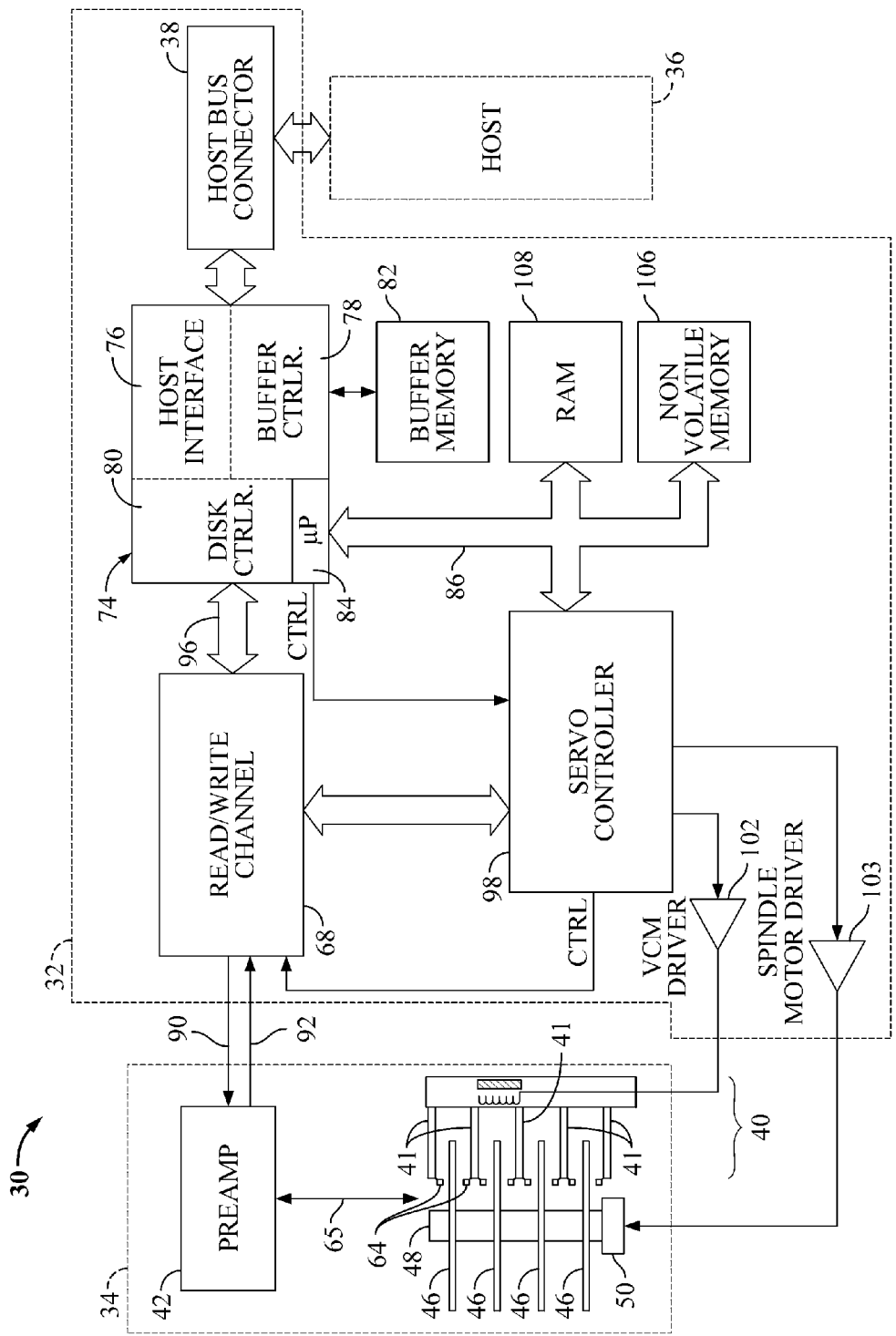
FIG. 1 shows a simplified block diagram of a disk drive that may be tested by a multi-cell disk drive test system, according to one embodiment of the invention.

FIG. 1 shows a simplified block diagram of a disk drive 30 that may be tested by a multi-cell disk drive test system, according to one embodiment of the invention. Disk drive 30 may comprise a Head/Disk Assembly (HDA) 34 and a controller printed circuit board assembly (PCBA) 32. Disk drive 30 may be of a suitable form factor and capacity for larger computers or for smaller mobile devices (e.g. a small form factor (SFF) disk drive). Host 36 may be a cell of the multi-cell disk drive test system as will be described.

HDA 34 may include: one or more disks 46 for data storage; a spindle motor 50 for rapidly spinning each disk 46 (four shown) on a spindle 48; and an actuator assembly 40 for moving a plurality of heads 64 in unison over each disk 46. Actuator assembly 40 includes a plurality of actuator arms 41 having heads 64 attached to distal ends thereof, respectively, such that the actuator arms 41 and heads 64 are rotated about a pivot point so that the heads sweep radially across the disks 46, respectively. The heads 64 are connected to a preamplifier 42 via a cable assembly 65 for reading and writing data on disks 46. Preamplifier 42 is connected to channel circuitry in controller PCBA 32 via read data line 92 and write data line 90.

Controller PCBA 32 may include read/write channel 68, servo controller 98, host interface and disk controller (HIDC) 74, voice coil motor (VCM) driver 102, spindle motor driver (SMD) 103, microprocessor 84, and several memory arrays—buffer or cache memory 82, RAM 108, and non-volatile memory 106.

Host initiated operations for reading and writing data in disk drive 30 may be executed under control of microprocessor 84 of HIDC 74 which is connected to the controllers and memory arrays via bus 86. Program code executed by microprocessor 84 may be stored in non-volatile memory 106 and random access memory RAM 108. Program overlay code stored on reserved tracks of disks 46 may also be loaded into RAM 108 as required for execution.

During disk read and write operations, data transferred by preamplifier 42 may be encoded and decoded by read/write channel 68. During read operations, channel 68 decodes data into digital bits transferred on an NRZ bus 96 to HIDC 74. During write operations, HIDC provides digital data over the NRZ bus to channel 68 which encodes the data prior to its transmittal to preamplifier 42. Channel 68 may employ PRML (partial response maximum likelihood) coding techniques, although other coding processes may be utilized.

HIDC 74 includes disk controller 80 for formatting and providing error detection and correction of disk data, a host interface controller 76 for responding to commands from host 36, and a buffer controller 78 for storing data which is transferred between disks 46 and host 36. Collectively the controllers in HIDC 74 provide automated functions which assist microprocessor 84 in controlling disk operations.

Servo controller 98 provides an interface between microprocessor 84 and actuator assembly 40 and spindle motor 50. Microprocessor 84 commands logic in servo controller 98 to position actuator assembly 40 using a VCM driver 102 and to precisely control the rotation of spindle motor 50 with a spindle motor driver 103.

In one embodiment, disk drive 30 employs a sampled servo system in which equally spaced servo sectors (termed servo sectors) are recorded on each track of each disk 46. Data sectors are recorded in the intervals between servo sectors on each track. Servo sectors are sampled at regular intervals by servo controller 98 to provide servo position information to microprocessor 84. Servo sectors are received by channel 68, and are processed by servo controller 98, to provide position information to microprocessor 84 via bus 86. Each servo sector may include a phase lock loop (PLL) field, a servo synch mark (SSM) field, a track identification (TKID) field, a sector identifier (ID), and a group of servo bursts, such as an alternating pattern of magnetic transitions, that the servo control system samples to align the moveable transducer head with, and relative to, a particular track.

Typically, servo controller 98 moves the transducer head 64 toward a desired track during a "seek" mode using the TKID field as a control input. Further, once the transducer head 64 is generally over a desired track, the servo controller 98 uses servo bursts to keep the transducer head 64 over the track in a "track follow" mode based upon demodulated PES values from the read servo bursts. During track following mode, the moveable transducer head 64 repeatedly reads the sector ID of each successive servo sector to obtain the binary encoded sector ID number that identifies each sector of the track. Based on the TKID and sector ID, the servo controller 98 continuously knows where the head 64 is relative to the disk 46 and communicates this to microprocessor 84. In this way, the microprocessor 84 continuously knows where the head 64 is relative to the disk and can command the movement of the head 64, via the servo controller 98, to implement disk drive operations, such as seeking, tracking, read/write operations, etc.

Figure 2:
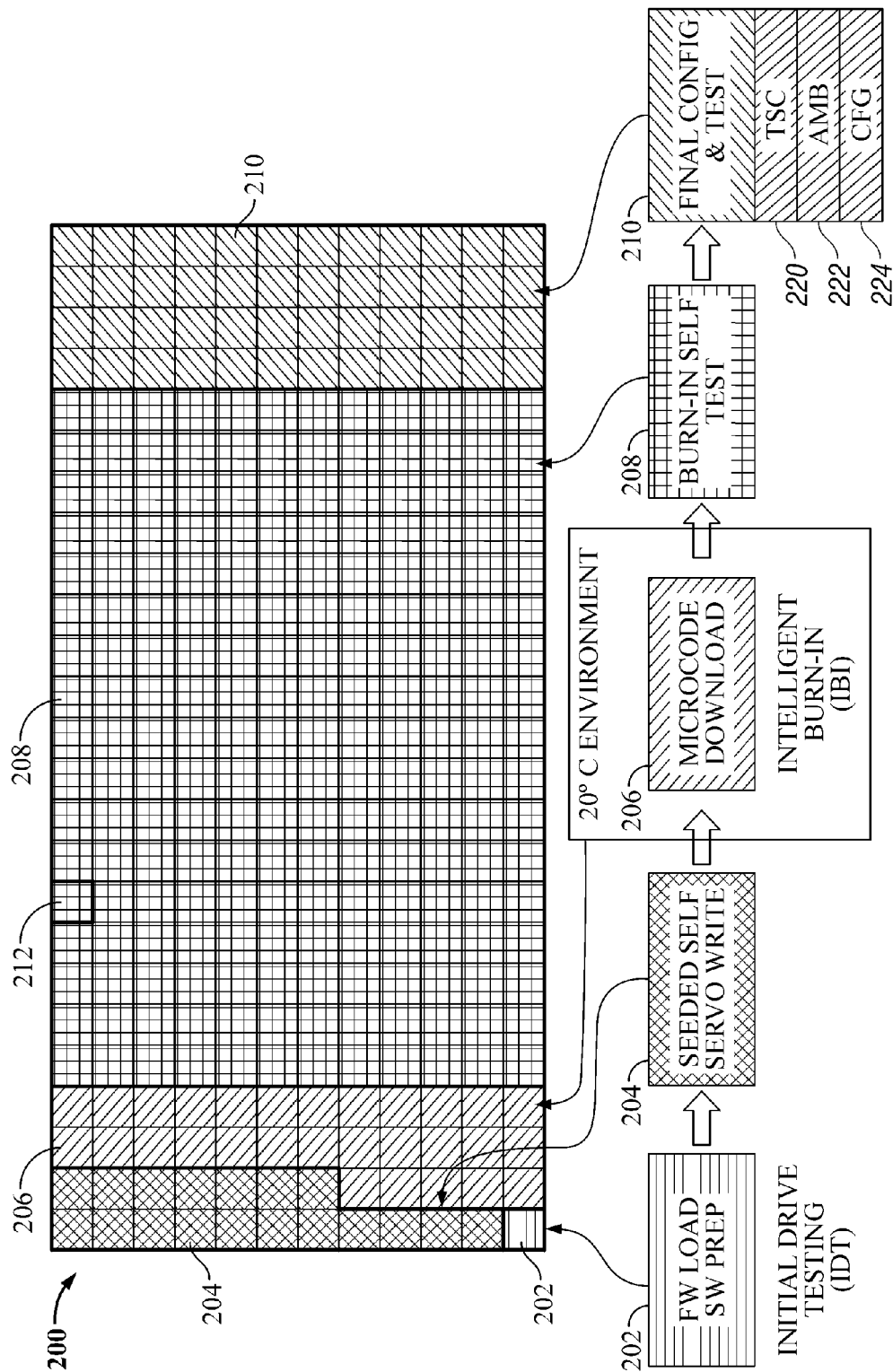
FIG. 2 is a functional diagram of a test platform of a multi-disk drive test system for carrying out a sequential series of tests or procedures on disk drives, and implementing a power recovery mode, according to one embodiment of the invention.

FIG. 2 is a functional diagram of a test platform 200 of a multi-disk drive test system for carrying out a sequential series of tests or procedures on disk drives, and for implementing a power recovery mode, according to one embodiment of the invention. As shown, the test platform or test wall 200 includes a plurality of cells, such as cell 212, into which the disk drives under test may be loaded and unloaded to administer a sequential series of tests or procedures on the disk drives. Each cell is configured to receive a disk drive under test (such as disk drive 30 in FIG. 1) and provide communication between the disk drive under test and a host, such as a test computer discussed below. The plurality of cells 212 of test wall 200 may be segregated into a plurality of groups. Each group of cells 212 may be configured to satisfy predetermined environmental (such as, for example, temperature, humidity, etc.), communication bandwidth and test schedule requirements of the disk drives under test to be loaded therein. The number of cells 212 in each of the groups may be roughly proportional to the time required for the tests or procedures to be carried out on the disk drives loaded in the cells of the group.

Underneath test wall 200 of FIG. 2, an exemplary series of sequential tests detailing the tests and procedures that may be sequentially carried out is shown. For example, the groups of cells 212 may include a first group 202 of cells 212 dedicated to loading necessary firmware and software into the disk drives loaded therein. Software and firmware loading in group 202 takes a comparatively short period of time. Further, as part of initial firmware and software loading, initial drive testing (IDT) may also be performed.

The next group 204 of cells 212 in the exemplary test schedule shown in FIG. 2 supports a seeded self-servo write procedure, in which servo information may be written to the disk or disks of the disk drive under test loaded therein. During this procedure, servo sector information may be written to the drive without using a servo track writer. In this example, a servo track writer may have pre-written a number of reference tracks and the seeded self-servo write procedure essentially performs an inbetweening process to write servo tracks between the reference tracks written by the servo track writer. Group 204 may not require communication with a host, as the software necessary to perform the seeded self-servo write may have been previously downloaded to the disk drive while the disk drive was loaded into one of the cells 212 of group 202.

The next group 206 of cells 212 supports microcode download, which is preferably carried out in an environmentally controlled environment, such as 20° C. As the microcode is downloaded from a host, communications between the disk drive under test loaded into the cells 212 of the group 206 and the host may be necessary. Accordingly, the process is for group 206 is labeled Intelligent Burn-In (IBI). The group having the largest number of cells 212 may be the group 208 in which the tests that take the longest time to complete are administered. Group 208 supports the burn-in self test, in which a lengthy calibration of the drive is performed, as well as procedures to discover, map and manage the defects on the media. The length of time necessary to complete this test is roughly proportional to the storage capacity of the disk drive under test.

The next and final group 210 of cells may be dedicated to administering final configurations and tests (termed Final Testing (FT)). This group 210 may require communication with a test computer, so as to verify the proper operation of host commands and analyzing and validating the results of the burn-in self-test carried out in the group 208. Desired performance characteristics of the drive, such as head seek time, for example, may be verified within this group 210 of cells 212, if desired. Further, more particular types of tests may be administered during final testing (FT). These types of test include: technical screen (TSC) tests 220 during which the disk drive is tested under extreme conditions, such as testing at very high temperature; generalized tests during ambient conditions AMB test 222; and customer configuration tests 224 in which the disk drive is tested and configured for a particular class or type of customer.

It should be understood that other tests and procedures may be carried out on the disk drives under test in addition to or in place of the tests discussed above.

Figure 3:
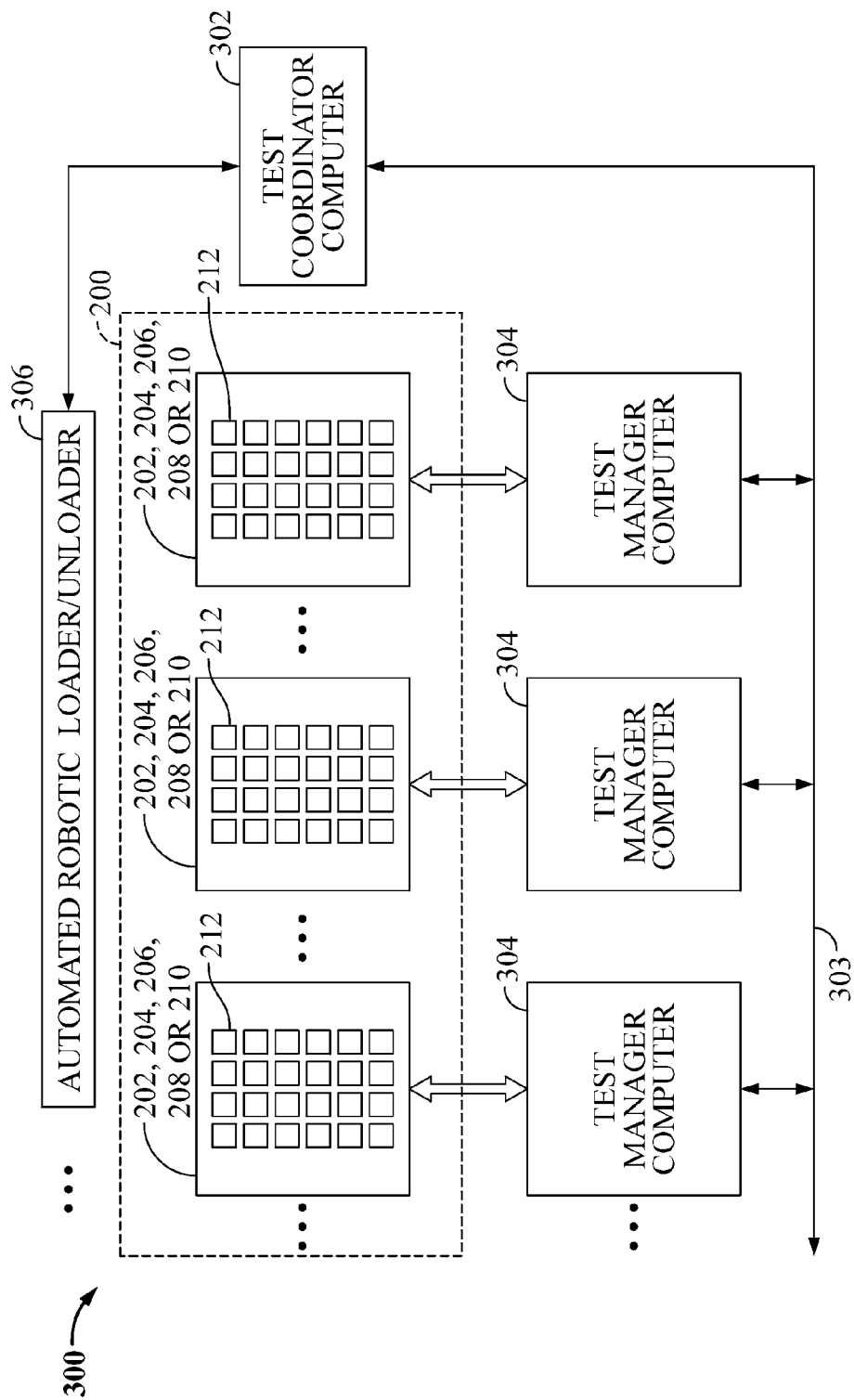
FIG. 3 is a simplified diagram of a multi-cell disk drive system for testing a plurality of disk drives that may implement a power recovery mode, according to one embodiment of the invention.

FIG. 3 is a simplified diagram of a multi-cell disk drive system 300 for testing a plurality of disk drives that may implement a power recovery mode, according to one embodiment of the invention. The system includes the previously-described test platform 200 that has the plurality of cells 212, wherein each cell 212 is configured to receive and to provide communication with a disk drive under test. As detailed above, the plurality of cells may be segregated into a plurality of groups 202, 204, 206, 208 or 210 and each such group may be configured to satisfy predetermined environmental, communication bandwidth and test schedule requirements of the disk drives to be loaded therein. In particular, each of the cells 212 may be self-contained with respect to environmental, communication bandwidth and test schedule requirements, thereby enabling any of the disk drives to be loaded into or unloaded from any of the cells 212 without affecting any of the other drives loaded in any of the other cells 212 and without affecting the testing or procedures carried out on the disk drives.

Also shown is an automated loader/unloader 306 that is configured to selectively load disk drives into and out of the test platform 200 and to move disk drives between cells of the plurality of groups. Portions of the system (such as the test platform 200) may be obtained from, for example, Xyratex International of San Jose, Calif. The automated loader/unloader 306 may be robotic, and is coupled to and controlled by a computer, shown in FIG. 3 as the test coordinator computer 302. The test coordinator computer 302 is aware of the current status of each drive under test within the system through test manager computers 304.

In one example, test coordinator computer 302 may issue commands that cause the automated loader/unloader to move the disk drives into and out of the system, as well as between groups thereof. The test coordinator computer 302 may be coupled to the automated loader/unloader and to the test manager computers 304 via an Ethernet connection 303. One or more test manager computers 304 may be assigned to each group 202, 204, 206 or 208 of cells 212. In this example, one test manager computer 304 is assigned to a group of twenty-four cells. Each group has at least one test manager computer 304 assigned thereto and the test manager computer 304 is connected to its constituent cells 212.

Each cell 212 may have a suitable processor, test logic, hardware, etc., to act as an input/output (I/O) controller for the disk drive that is loaded therein and may administer at least one of the sequential tests to the disk drive loaded therein, all the while ensuring that the predetermined environmental, communication bandwidth and test schedule requirements of its assigned group remain satisfied. Each test manager computer 304 may also aid in the administration of tests to the disk drives loaded in the cells 212 of its assigned group and may communicate test results to test coordinator computer 302.

Test coordinator computer 302 is coupled to and communicates with each test manager computer 304 and is also coupled to and controls the automated loader/unloader 306 as it moves disk drives under test into test platform 200, out of test platform 200, and between groups. The movement of each disk drive into, out of, and between groups 202, 204, 206 or 208 of the test platform 200 may be carried out asynchronously by the automated loader/unloader 306. That is, the system does not wait for all disk drives under test loaded into the cells 212 of a given group to have finished the administered test and does not move the disk drives in batch mode out of the test platform or to cells of another group. Instead, as individual disk drives fail any test or procedure, pass a test or complete a procedure or complete the entire series of sequential tests, they are moved asynchronously, as and when needed. This leads to great efficiencies in the full usage of the cells 212 of the test platform, as disk drives are moved in and out of the test platform and within the test platform as needed, and are not limited by the slowest drive finishing the administered test or the entire test sequence.

Test manager computers 304 and cells 212 may communicate with the disk drives under test loaded into the cells 212 according to the Serial Advanced Technology Architecture (ATA) point-to-point protocol. SATA is a widely used acronym for the serial ATA protocol. However, other serial and/or parallel protocols may be utilized. For example, other parallel interfaces and protocols such as, EIDE, PATA, etc., may be utilized as well as other types of serial interfaces and protocols such as, SCSI, Firewire, Fiber Channel, USB, SAS, etc. Also, both the test coordinator computer 302 and the test manager computers 304 may include personal computers (PCs) running, for example, a Linux operating system or a Microsoft operating system, such as Windows XP or Windows 2000 Professional for example. Further, both the test coordinator computer 302 and the test manager computers 304 may be generally-known personal computers having a suitable processor, memory, display, etc., and other hardware to perform this functionality.

Figure 4:
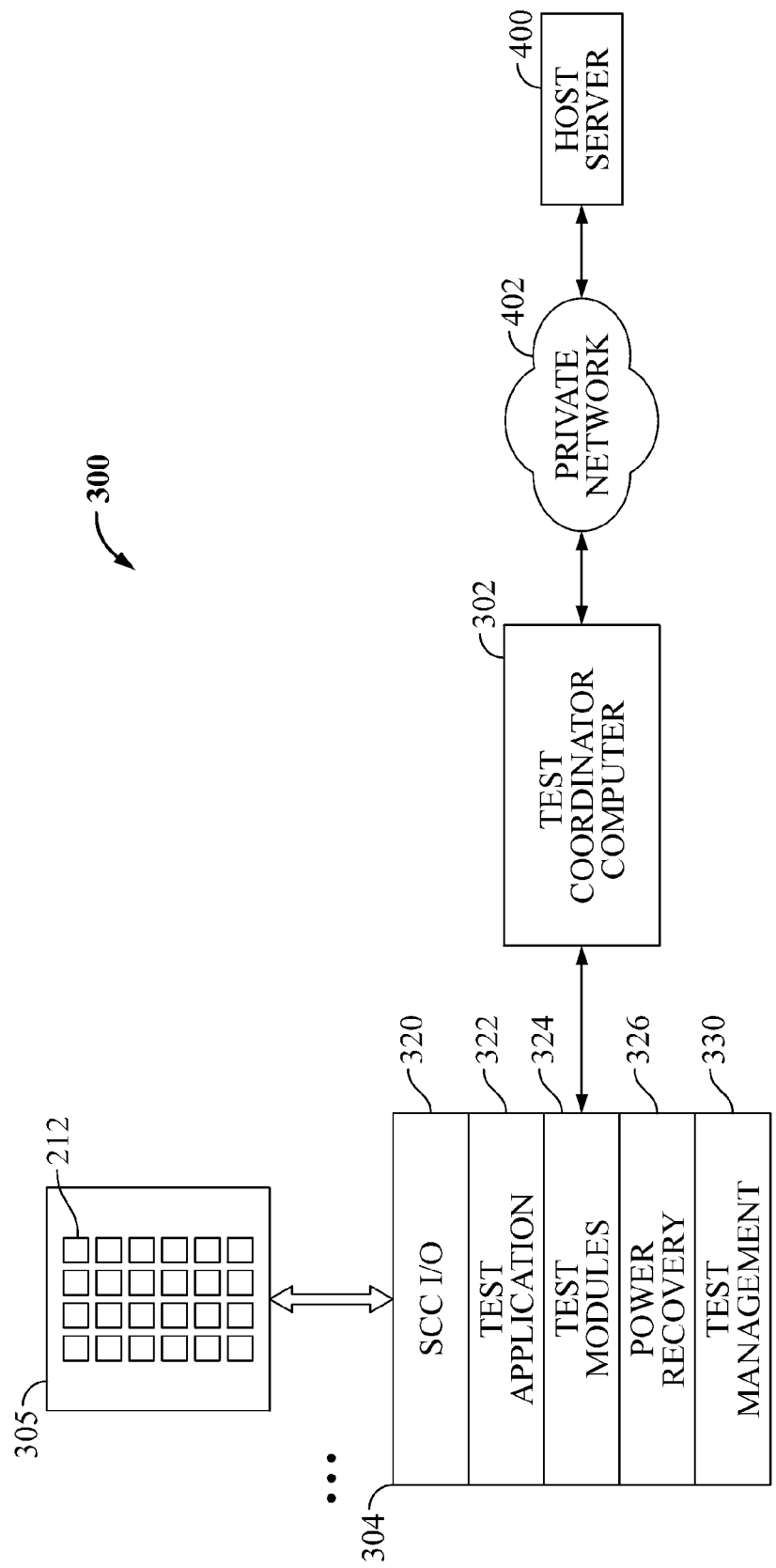
FIG. 4 is a block diagram illustrating more detailed aspects of a multi-cell disk drive test system that includes a power recovery mode, according to one embodiment of the invention.

Turning now to FIG. 4, FIG. 4 is a block diagram illustrating more detailed aspects of a multi-cell disk drive test system 300 that includes a power recovery mode, according to one embodiment of the invention. In this example, the multi-cell disk drive test system 300 includes a test manager computer 304, a test coordinator computer 302, and a test platform having a plurality of cells 212.

As previously described, the test platform includes a plurality of cells 212 in which each cell 212 is configured to receive and to provide communication with a disk drive loaded therein, and in which the plurality of cells may be segregated into a plurality of groups. A test manager computer 304 is assigned to each group of cells—illustrated here as group of cells 305. Test manager computer 304 is coupled to an assigned group of cells 305 to administer at least one of a plurality of tests steps to the disk drives loaded in the assigned group of cells 305.

In one embodiment, test logic is coupled to a cell 212 and is configured to operate a test application. The test logic may include a processor and/or other circuitry. The test logic may be present in cell 212 itself and/or may be that of the test manager computer 304. In one embodiment, the test logic of a cell 212 operates a test application software module 322, test software modules 324, and a power recovery software module 326, and the test manager computer 304 operates a single cell controller (SCC) input/output (I/O) software module 320 and a test management software module 330. Alternatively, test manager computer 304 may operate the test application software module 322, the test software modules 324, and the power recovery software module 326, as well.

Each particular type of test application software module 322 executes a particular set of software test modules 324 to implement desired procedures and testing (e.g., IDT, IBI, Burn-In Self Test, and FT, etc.) on the disk drive, as previously described. Further, test application software module 322 also implements a power recovery software module 326.

Test manager computer 304 operates SCC I/O module 320 to communicate with the cells 212 of the test platform 305 and particularly to receive test results from the cells 212 of the test platform 305 as to the status of disk drives under test. Test manager computer 304 operates test management module 330 to perform general testing and control operations and particularly to check the status of the tests performed on the disk drives loaded in the cells 212 of the test platform 305 (via SCC I/O module 320) and to communicate these results back to test coordinator computer 302.

Test coordinator computer 302 may be configured to communicate with each test manager computer 304 (only one shown) and to operate generalized test coordination functions, as previously described. Additionally, as shown in FIG. 4, a host server 400 may store various test applications and test modules that may be transmitted through a network 402 to the test coordinator computer 302 and to the various test manager computers 304. The network 402 may be a private network, such as, a local area network (LAN) or even a wide area network (WAN), and the test applications and test modules may be specific to a particular disk drive manufacturer. As part of the network, additional host computers and/or resources may be present. It should be appreciated that instead of a private network, a public network, such as the Internet may be utilized.

In one embodiment, test logic, such as, test manager computer 304 or a cell 212, may be configured to operate a test application module 322 to: execute a series of test modules 324 to test a disk drive loaded in a cell 212 and to switch from a normal mode to a power recovery mode responsive to a power recovery flag related to a power failure. In the power recovery mode, test application 322 is used to read a test sequence index identifying the last completed test module before the power failure occurred and to execute a subsequent series of test modules following the last completed test module for the disk drive.

In one embodiment, after a test module 324 is executed, a test sequence index may be updated with a test module identification number identifying the test module previously performed. This test sequence index may be stored on a reserved cylinder of a disk of a disk drive. Further, in the power recovery mode, test application 322 may cycle through and skip the series of test modules 324 preceding the last completed test module before the power failure, and then executes the subsequent series of test modules 324 following the last completed test module (as indicated by the test sequence index stored on the disk) for the disk drive.

It should be appreciated that test application 322 may be implemented by either a cell 212, test manager computer 304, or combinations thereof. Particularly, a processor and/or test logic may operate under the control of a program or routine to execute methods or processes in accordance embodiments of the invention. For example, such a program may be implemented in or software or firmware. Further, it should be appreciated that the terms processor, logic, microprocessor, circuitry, controller, etc., refer to any type of logic or circuitry capable of executing logic, commands, instructions, software, firmware, functionality, etc.

It should be noted that aspects of the embodiments of the invention may be implemented by software. The software may have several modules coupled to one another. A software module is coupled to another module to receive variables, parameters, arguments, pointers, etc. and/or to generate or pass results, updated variables, pointers, etc. A software module may also be a software driver or interface to interact with the operating system running on the platform. A software module may also be a hardware driver to configure, set up, initialize, send and receive data to and from a hardware device.

Figure 5:
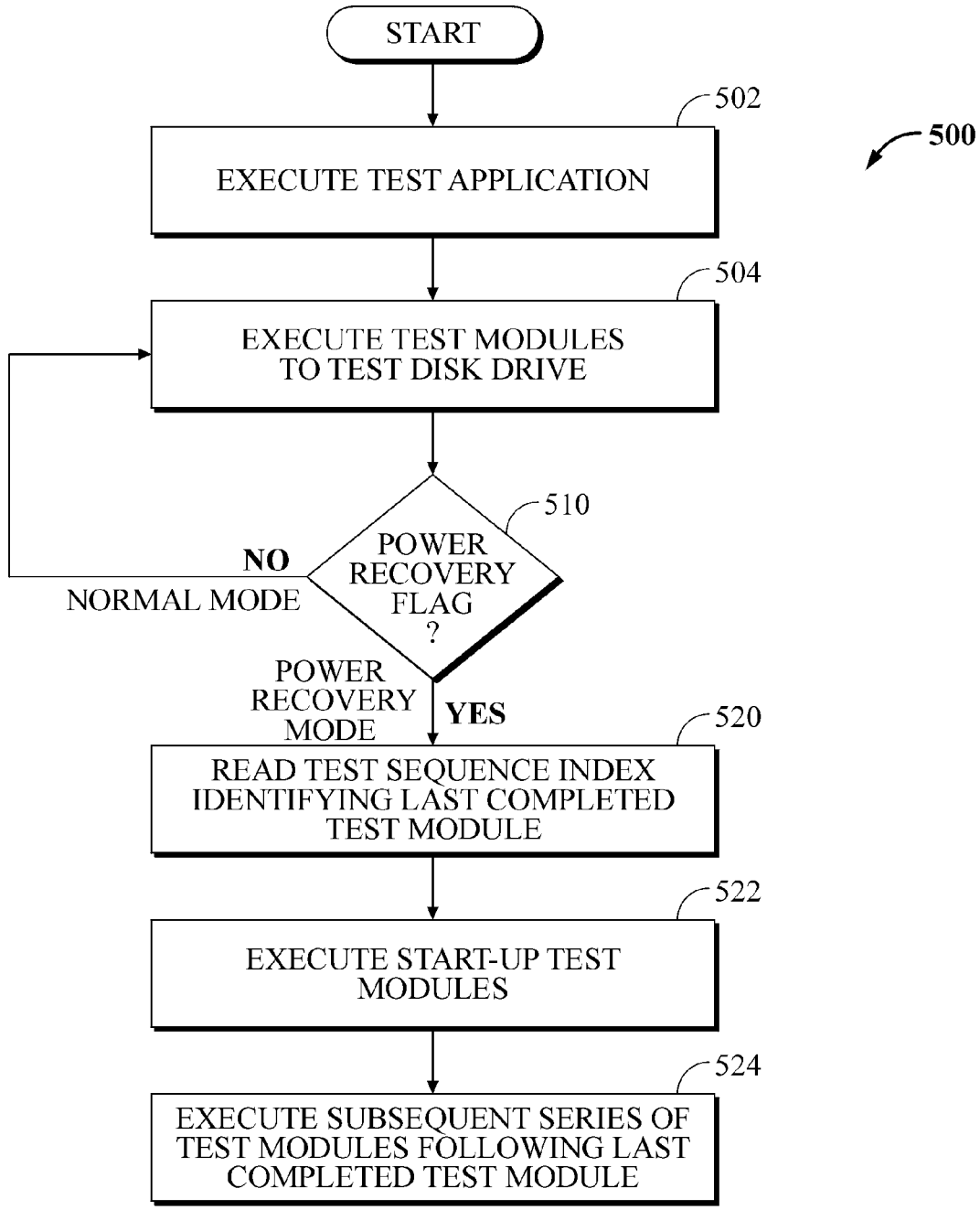
FIG. 5 is a flow diagram illustrating a process to implement a power recovery mode in a multi-cell disk drive test system, according to one embodiment of the invention.

Turning now to FIG. 5, FIG. 5 shows a flow diagram illustrating a process 500 to implement a power recovery mode in a multi-cell disk drive test system, according to one embodiment of the invention. It should be appreciated that either test manager computer 304 or a cell 212 including suitable test logic may accomplish the particular functions to be hereinafter described. At block 502, a test application is executed to test a disk drive. A test application typically includes a series of test modules. The series of test modules are executed to test the disk drive (block 504). As previously described, each particular type of test application executes a particular set of test modules to implement desired procedures and testing (e.g., IDT, IBI, Burn-In Self Test, and FT, etc.) on the disk drive.

However, if a power recovery flag is received by a test application (block 510), then a power recovery mode is entered. If not, process 500 continues executing test modules in a normal mode. A power recovery flag would be received by a test application if the multi-cell disk drive test system encountered a power failure. The power recovery flag may be generated by the test manager computer, the test coordinator computer, the test platform, the cell itself, or from other locations. It should be appreciated that it is possible that a single cell or a group of cells may encounter a power failure and a power recovery flag for those cells would be set and received by the test application whereas the rest of the multi-cell disk drive test system is unaffected by the localized power failure.

In any event, a power recovery mode is switched to from the normal mode responsive to the power recovery flag being set which indicates a power failure has occurred. In the power recovery mode, a test sequence index identifying a last completed test module before the power failure is read (block 520). The test sequence index may be stored on a reserved cylinder of the disk of the disk drive under test. Next, start-up test modules are executed for the disk drive (block 522). Typically these start-up test modules include a disk drive wake-up test module and a disk drive initialization test module to start-up and initialize the disk drive. Then, a subsequent series of test modules following the last completed test module before the power failure occurred are executed for the disk drive (block 524).

Even more particularly, after the start-up test modules are executed, the test application cycles through the series of test modules preceding the last completed test module before the power failure, and then executes the subsequent series of test modules following the last completed test module for the disk drive. Thus, during the power recovery mode, the test application identifies the last test module performed prior to the power failure by reading a test sequence index stored on a reserved cylinder of the disk and, with this information, the test application starts the testing process again with the next test module following the last completed test module for the disk drive.

In one embodiment, with reference back to FIG. 4, the SCC I/O module 320 of the test manager computer 304 passes the power recovery flag (e.g., 1=power recovery mode; 0=normal mode) to the test application 322 to indicate whether normal mode operations should continue or whether power recovery mode operations should begin. In the normal mode, the test application 322 receives a power recovery flag of zero (i.e. not set) from the test manager computer 304 and continues normal mode operations. Accordingly, the test application 322 continues executing the series of test modules 324 sequentially to test the disk drive in the cell.

Figure 6:
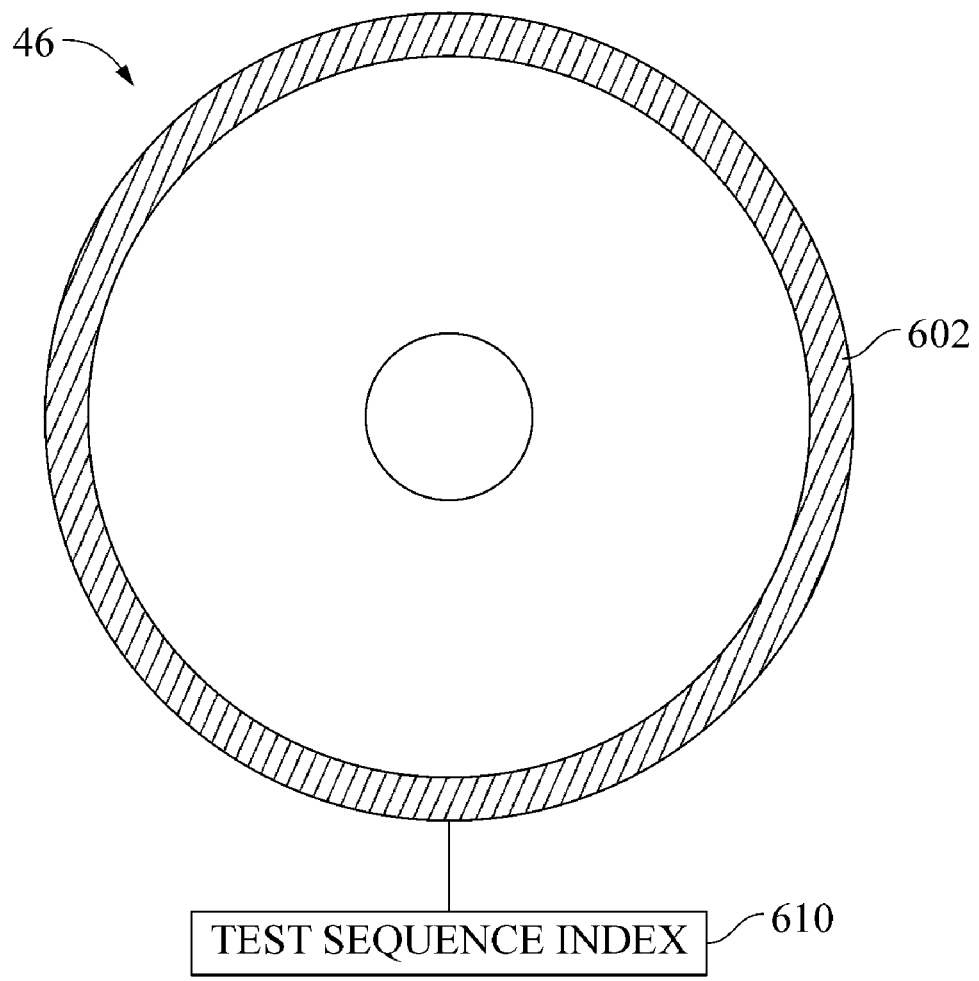
FIG. 6 is a diagram illustrating a test sequence index that may be stored on a reserved cylinder of a disk of a disk drive, according to one embodiment of the invention.

At the end of every test module, a test sequence index is updated with test module identification information. With brief reference to FIG. 6, FIG. 6 is a diagram that shows a test sequence index 610 stored on a reserved cylinder 602 of disk 46 of disk drive 30. For example, the reserved cylinder of the disk may be at the outer diameter (OD) of the disk drive. In particular, disk drive 30 under the control of the microprocessor 84 and servo controller 98 may command that test sequence index 610 be written on reserved cylinder 602 of disk 46.

Test sequence index 610 may then be utilized during the power recovery mode, as previously described. In particular, the test module identification information of test sequence index 610 identifies the last completed test module before a power failure occurs. Test sequence index 610 is updated with the last test module identification information after each test module is performed during either the normal mode or the power recovery mode. After the last test module of a test application is performed, test sequence index 610 is written to zero.

Continuing with the present example, in the event of a power failure, the SCC I/O module 320 of the test manager computer 304 passes a set power recovery flag (i.e., set to 1) to the test application 322 and the test application 322 then switches to a power recovery mode and implements the power recovery module 326.

In order to accomplish this, the disk drive is first powered-up such that the test sequence index of the reserved cylinder of disk may be retrieved. However, if the test sequence index cannot be properly read, the disk drive may continue the test application in the normal mode from the first test module.

If the test sequence index is properly read, then the test application 322 backs up to the first start-up test module. Start-up test modules typically include at least a disk drive wake-up test module and a disk drive initialization test module along with other standard start-up test modules. These start-up test modules may be identified to the test application 322 by always having power recovery flags associated with these test modules set (i.e. set to one).

The test application 322 cycles back to the first start-up test module, which has a power recovery flag set (i.e., set to one), and the test application executes the start-up test modules. After the start-up test modules are executed, the test application 322 cycles through the series of test modules 324 preceding the last completed test module before the power failure, and then executes the subsequent series of test modules following the last completed test module for the disk drive. It should be noted that the test application 322 skips test modules 324 that do not have a power recovery flag set and continuously cycles through the test modules 324 until it reaches the text sequence index read from the disk. Once that test sequence index is reached, the test application performs the subsequent series of test modules following the last completed test module indicated by the test sequence index. After all the test modules 324 are executed successfully on the disk drive or the disk drive fails, the test sequence index is reset to zero to avoid any conflicts.

Figure 7:
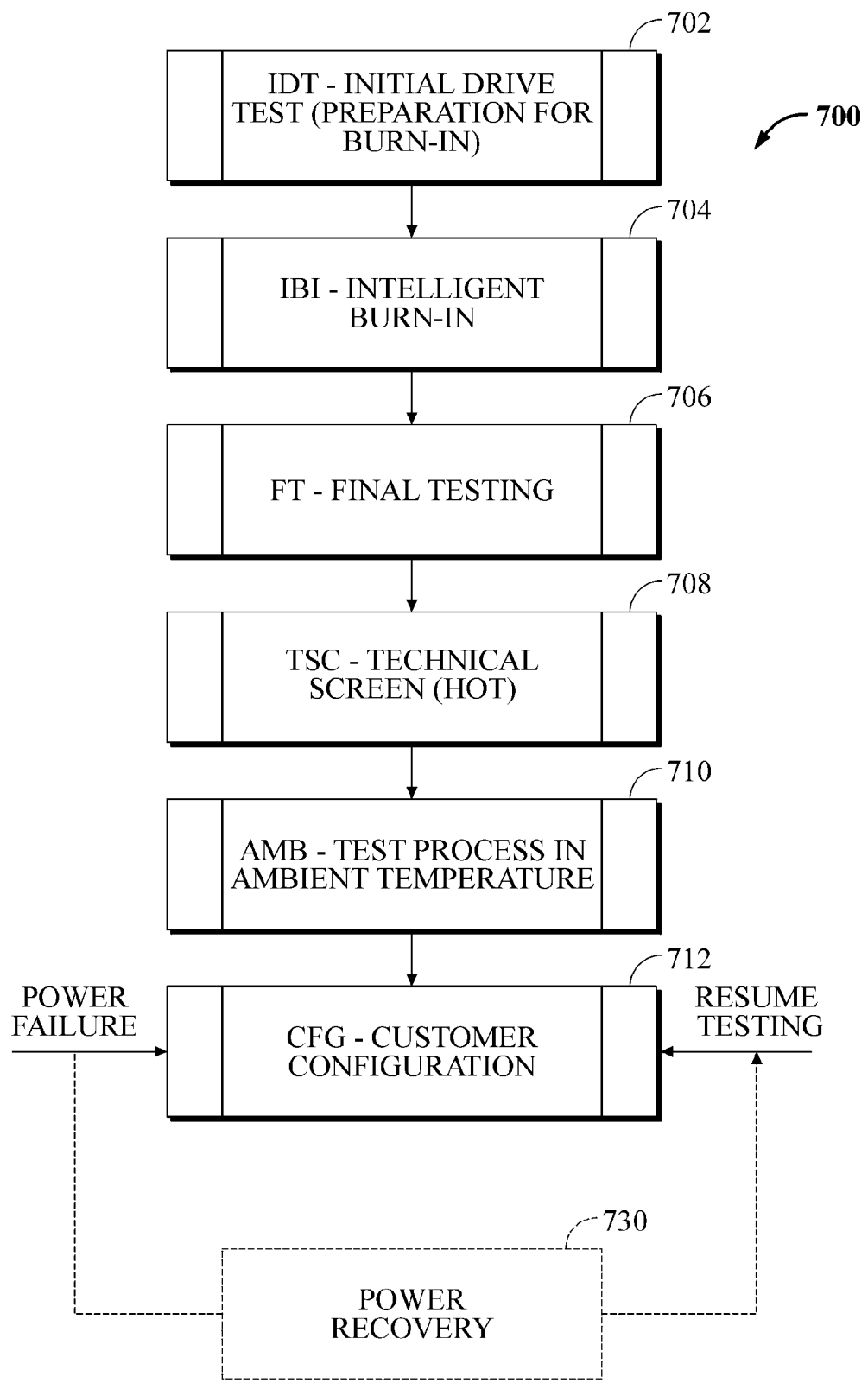
FIG. 7 is a flow diagram that illustrates a disk drive testing process utilizing a power recovery mode for a multi-cell disk drive test system, according to one embodiment of the invention.

Turning to FIG. 7, FIG. 7 is a flow diagram that illustrates a disk drive testing process utilizing a power recovery mode 700 for a multi-cell disk drive test system, according to one embodiment of the invention. As an example, an initial drive test (IDT) test application including IDT test modules may be executed to prepare a disk drive for burn-in (block 702). Next, an intelligent burn-in (IBI) test application including IBI test modules may be executed to burn-in microcode (block 704).

Process 700 then moves to final testing phase in which a final testing (FT) test application including final testing modules may be executed to perform final tests on the disk drive (block 706). For example, a technical screen (TSC) test application including TSC test modules may be executed to test the disk drive at extremely high temperatures (block 708). Additionally, an ambient (AMB) test application including AMB test modules may be executed to test the disk drive at ambient temperatures (block 710).

After all of these test modules are executed, a customer configuration (CFG) test application including CFG test modules may be executed to particularly configure and test the disk drive for a particular type or class of customer. However, as illustrated in this example, a power failure may occur during the execution of CFG test application 712. If this occurs, a power recovery flag relating to the power failure is set and power recovery mode 730 is entered.

As has been described in detail, in power recovery mode 730, a test sequence index is read identifying the last completed CFG test module before the power failure occurred and the subsequent series of CFG test modules following the last completed test module for the disk drive are then automatically executed. As can be seen in FIG. 7, after a power failure occurs, the power recovery mode 730 is entered, and CFG test application 712 is resumed after the last completed CFG test module.

In typical multi-cell disk drive test systems, without power recovery logic, testing would normally begin again at IDT test application 702 and all of the following test applications and test modules (702, 704, 706, 708, 710, and 712) would have to be repeated. However, by utilizing power recovery logic 730, all of this repetitive testing is avoided. Thus, the overhead of this additional testing time is eliminated when power failures occur. This significantly reduces the overall cost of disk drive manufacturing.

It should be appreciated that components of the various embodiments of the invention may be implemented in hardware, software, firmware, microcode, or any combination thereof. When implemented in software, firmware, or microcode, the elements of the embodiments of the present invention are the program code or code segments to perform the necessary tasks. A code segment may represent a procedure, a function, a subprogram, a program, a routine, a subroutine, a module, a software package, a class, or any combination of instructions, data structures, or program statements. The program or code segments may be stored in a computer or processor readable medium. The "processor readable or accessible medium" or "computer readable or accessible medium" may include any medium that can store, transmit, or transfer information. Examples of the processor/computer accessible medium include an electronic circuit, a semiconductor memory device, a read only memory (ROM), a flash memory, an erasable ROM (EROM), a floppy diskette, a compact disk (CD-ROM), an optical disk, a hard disk, etc. The computer/processor accessible medium may include data that, when accessed by a computer/processor, cause the computer/processor to perform the operations previously described.

It should be appreciated by those with skill in this art that, although embodiments of the invention have been previously described with reference to particular test computers and software modules, that embodiments of the invention may be utilized in a wide variety of differing multi-cell disk drive test systems utilizing various types of computers, test equipment, software, interfaces, etc.

We claim:

1. A multi-cell disk drive test system comprising:
a test platform including a plurality of cells configured to receive and to provide communication with disk drives loaded therein, respectively; and
test logic coupled to a cell configured to operate a test application to:
execute a series of test modules to test a disk drive loaded in the cell;
switch from a normal mode to a power recovery mode responsive to a power recovery flag relating to a power failure interrupting execution of the series of test modules; and
in the power recovery mode,
read a test sequence index identifying a last completed test module of the series of test modules before the power failure; and
execute test modules subsequently following the last completed test module of the series of test modules for the disk drive.

2. The system of claim 1, wherein, after a test module is executed, the test sequence index is updated with a test module identification information.

3. The system of claim 2, wherein, the test sequence index is stored on a reserved cylinder of a disk of the disk drive.

4. The system of claim 2, wherein, after a last test module is executed, the test sequence index is written to zero on the disk.

5. The system of claim 1, wherein, before executing the test modules subsequently following the last completed test module, the test application executes start-up test modules for the disk drive.

6. The system of claim 5, wherein, the start-up test modules include at least one of disk drive wake-up test module and a disk drive initialization test module.

7. The system of claim 5, wherein, the start-up test modules have a power recovery flag set.

8. The system of claim 5, wherein, after the start-up test modules are executed, the test application cycles through a series of test modules preceding the last completed test module before the power failure, and then executes the test modules subsequently following the last completed test module for the disk drive.

9. A method for providing a power recovery mode in a multi-cell disk drive test system used for testing a plurality of disk drives including a test platform having a plurality of cells wherein each cell is configured to receive and to provide communication with a disk drive loaded therein, the method comprising:
executing a series of test modules to test a disk drive loaded in a cell;
switching from a normal mode to a power recovery mode responsive to a power recovery flag relating to a power failure interrupting execution of the series of test modules; and
in the power recovery mode,
reading a test sequence index identifying a last completed test module of the series of test modules before the power failure; and
executing test modules subsequently following the last completed test module of the series of test modules for the disk drive.

10. The method of claim 9, further comprising updating the test sequence index with a test module identification information after the test module is executed in the disk drive.

11. The method of claim 10, wherein, the test sequence index is stored on a reserved cylinder of a disk of the disk drive.

12. The method of claim 10, wherein, after a last test module is executed, further comprising writing the test sequence index to zero on the disk.

13. The method of claim 9, wherein, before executing the test modules subsequently following the last completed test module, further comprising executing start-up test modules for the disk drive.

14. The method of claim 13, wherein, the start-up test modules include at least one of disk drive wake-up test module and a disk drive initialization test module.

15. The method of claim 13, wherein, the start-up test modules have a power recovery flag set.

16. The method of claim 13, wherein, after the start-up test modules are executed, further comprising:
cycling through a series of test modules preceding the last completed test module before the power failure; and
executing the of test modules subsequently following the last completed test module.

17. In a multi-cell disk drive test system used for testing a plurality of disk drives that includes a test platform having a plurality of cells, wherein each cell is configured to receive and to provide communication with a disk drive loaded therein, a non-transitory processor-readable medium having stored thereon instructions, which when executed by a processor, cause the processor to perform the following operations comprising:
executing a series of test modules to test a disk drive loaded in a cell;
switching from a normal mode to a power recovery mode responsive to a power recovery flag relating to a power failure interrupting execution of the series of test modules; and
in the power recovery mode,
reading a test sequence index identifying a last completed test module of the series of test modules before the power failure; and
executing test modules subsequently following the last completed test module of the series of test modules for the disk drive.

18. The processor-readable medium of claim 17, further comprising instructions to perform the operations of updating the test sequence index with a test module identification information after the test module is executed in the disk drive.

19. The processor-readable medium of claim 18, further comprising instructions to perform the operations of storing the test sequence index on a reserved cylinder of a disk of the disk drive.

20. The processor-readable medium of claim 18, further comprising instructions to perform the operations of writing the test sequence index to zero on the disk after a last test module is executed.

21. The processor-readable medium of claim 17, further comprising instructions to perform the operations of executing start-up test modules for the disk drive before executing the test modules subsequently following the last completed test module.

22. The processor-readable medium of claim 21, wherein the start-up test modules include at least one of disk drive wake-up test module and a disk drive initialization test module.

23. The processor-readable medium of claim 21, wherein the start-up test modules have a power recovery flag set.

24. The processor-readable medium of claim 21, further comprising instructions to perform, after the start-up test modules are executed, the operations of:
    cycling through a series of test modules preceding the last completed test module before the power failure; and
    executing the test modules subsequently following the last completed test module.

\* \* \* \* \*